June 15, 1948. R. P. FERLEN 2,443,382
SEXTANT

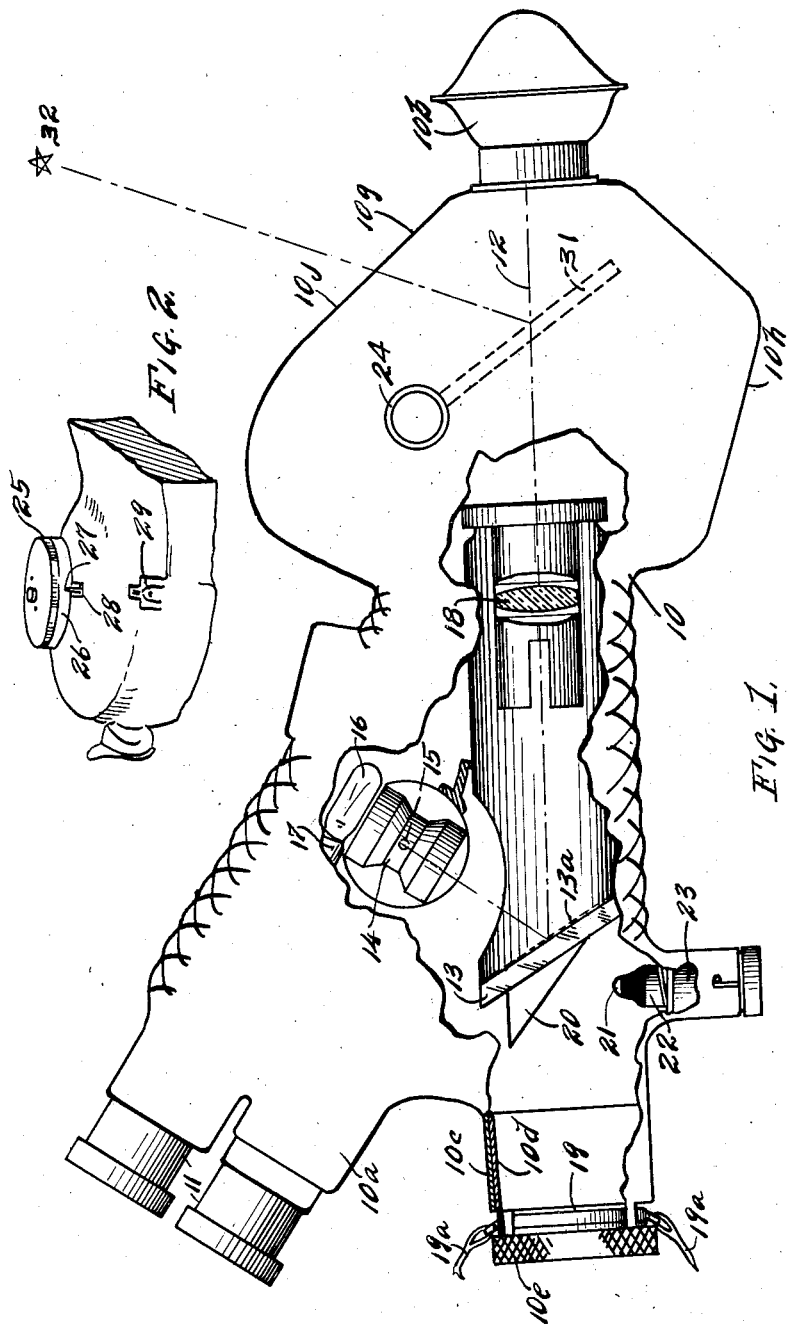

Filed July 20, 1944 2 Sheets-Sheet 2

INVENTOR
RUSSELL P. FERLEN
BY Chas. C. Reif
ATTORNEY

Patented June 15, 1948

2,443,382

UNITED STATES PATENT OFFICE 2,443,382

SEXTANT

Russell Parry Ferlen, Minneapolis, Minn.

Application July 20, 1944, Serial No. 545,859

4 Claims. (Cl. 88—2.3)

This invention relates to a sextant or instrument for determining the elevation of certain bodies such as celestial bodies. Such textants are now commonly used on airplanes as well as on ships and other places. In making an observation of an object such as the sun or of a star the image of said object is located in a certain manner with respect to a mirror in said sextant commonly in connection with a bubble of a bubble mechanism and when properly located a record is made on said sextant and the operator notes the time of observation. Heretofore the operator has used a time piece separate from the sextant for noting the time and he must take his eye from the sight opening of the sextant and look at the watch or other time piece in order to note the time.

It is an object of this invention to provide a sextant having a time piece carried therein and so disposed in relation to a mirror in which the image of the said bubble is observed so that when the operator has the image properly located he can at the same time, view the time piece and note the time without taking his eye from the sight opening of the sextant.

It is a further object of the invention to provide a sextant comprising a casing in which a bubble mechanism is disposed, said casing having a sight opening, a mirror located so as to be viewed from said sight opening and in which the bubble of said bubble mechanism is reflected together with a time piece disposed beyond said mirror and having a dial, a portion of which can be observed about said mirror by the operator having his eye at said sight opening.

It is another object of the invention to provide said casing with a removable portion so that said time piece can be easily and quickly inserted in place in said casing and if desired, the operator can use an ordinary wrist watch in the casing.

It is still another object of the invention to provide a sextant such as set forth in the preceding paragraph save one, together with means for illuminating the dial of said time piece.

These and other objects and advantages of the invention will be fully set forth in the following description made in connection with the accompanying drawings in which like reference characters refer to similar parts throughout the several views and in which:

Fig. 1 is a view partly in side elevation and partly in vertical section of a sextant embodying the present invention, certain parts being broken away;

Fig. 2 is a perspective view of a portion of the side of said sextant opposite the side shown in Fig. 1;

Figure 3:
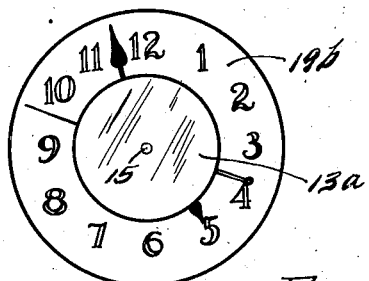
Fig. 3 is a partial view showing the relation of certain parts of the device.

Referring to the drawings a sextant is shown comprising a casing 10 which has the general shape in side elevation shown in Fig. 1 and which is rather flat or narrow in transverse dimension as indicated in Fig. 2. The casing 10 is shown as having a projecting portion 10a at one end in which are secured removable members 11 adapted to hold in place and be removed for insertion of certain dry batteries. A sight opening is provided at one end of casing 10 adjacent which the operator can place his eye and look into the casing 10. An eye piece 10b is provided at said sight opening. The line of vision of the operator having his eye adjacent the eye piece or sight opening 10b is indicated by the dot and dash line 12. Disposed in line with said sight opening is a glass or transparent plate 13 shown as extending in a slanting or diagonal direction across the line of vision 12. Plate 13 has a central portion thereof formed as a mirror on the side adjacent the sight opening and said mirrored portion 13a is preferably made circular in outline. Also disposed in line with the sight opening and mirror is a collimating lens 18. A bubble mechanism is provided contained in a casing 14 and comprising a movable bubble 15. This bubble mechanism is commonly used and is well known and comprises the bubble 15 which is movable in a liquid disposed between transparent plates. It is thought further description of the same will be unnecessary. The bubble mechanism is so located that the sum of the distances from the center of lens 18 to the center of mirror 13 and from the center of mirror 13 to bubble 15 is equal to the principal focus of lens 18. A lamp 16 is provided carried in a socket 17 and said lamp is disposed so as to shine through the bubble mechanism and so that the image of said bubble can be clearly seen on the surface of mirror 13a which is thus illuminated by lamp 16. Lamp 16 will be supplied with current from a dry battery carried in casing 10. The portion of plate 13 about the mirror 13a is clear or transparent. The end 10c of casing 10 is shown as cylindrical and a removable sleeve 10d is insertible therein having a knurled cap portion 10e. Portions 10d and 10e are readily removable and adapted to have placed therein with one side against the end portion 10e, a time piece 19 such as an ordinary watch or wrist watch. In the embodiment of the invention illustrated a wrist watch is shown having the usual wrist encircling strap portion 19a. The dial of watch 19 is substantially perpendicular to the line of sight or line 12 and is located at a distance from lens 18 substantially equal to the principal focus or principal focal distance of said lens. Carried on the rear of plate 13 is a mirror 20 having its mirrored surface directed toward the time piece 19 and disposed at an angle to the line 12. A lamp 21 is carried in a socket 22 and supplied with current from a suitable dry battery 23, which lamp 21 is disposed so that the light therefrom will be reflected from mirror 20 onto the dial of time piece 19, which dial is at the inner side of time piece 19. The said dial 19b as shown in Fig. 3, is of larger diameter than the mirror 13a so that an outer annular portion of said dial and portions of the cooperating hands can be seen around mirror 13a. At the other side of casing 10 is a cylindrical member or drum 25 which carries a tape 26 adapted to be marked by a small pencil 27 carried in a holder 28 which is moved across said tape by the operator pressing on a finger lever 29 disposed in convenient position for operation by the thumb of the left hand of the operator using the sextant. An index glass 31 is provided adjacent the sight opening at eye piece 10b in casing 10 which may be moved to different positions about a shaft or sleeve 24. Shaft 24 has secured thereto an arm having a vernier scale adjacent its end which moves along another arcuate graduated scale (not shown) which is disposed at the side of casing 10 opposite that shown in Fig. 1. Drum 25 is geared to shaft 24 so that movement of said drum moves said arm and index glass 31. The parts 25 to 31 are cmomon in sextants and form no part of the present invention and are merely mentioned to facilitate an understanding of the operation of the sextant.

In operation if an object such as a celestial body, as for instance the sun or a star 32, is to be observed the operator holds the sextant so that the top part of the casing 10g is substantially horizontal. The operator will place his eye at the sight opening at the eye piece 10b and will, with the thumb and fingers of the right hand, lightly grasp the drum 25. The drum is now rotated as necessary to bring the image of the celestial object such as the sun into the range of vision. Sight glass 31 is oscillated and the image of said object will be reflected from the surface of index glass 31 into the eye of the observer when index glass 31 comes into the correct position. Said arm secured to shaft 24 is simultaneously oscillated along said arcuate scale so that when the image is correctly positioned the elevation of the object will be indicated on said arcuate scale. The operator manipulates drum 10 until the image of the object appears to be superimposed on the image of bubble 15 at the center of mirror 13a. With the image of the object and the image of the bubble 15 appearing as coinciding in the center of mirror 13a an ideal condition for a record is produced. When bubble 15 is in the center of mirror 13a the sextant is in proper or horizontal position with part 10g horizontal. The operator now presses on finger piece 29 moving pencil 27 across the tape 26 to make a mark thereon. The rays from bubble 15 and watch 19 after passing through lens 18 extend in lines parallel to line 12. In other words, the lens focuses the rays on bubble 15 and time piece 19 so that they can be clearly and sharply seen. When the operator manipulates the device to bring the image of the bubble 15 into the described position on mirror 13a in line with the image of the object, he can look past said mirror through the transparent portion of plate 13 and see the outer portion of dial 19b as illustrated in Fig. 3, and the numerals thereon. The outer portion of the hands of the watch or time piece 19 can also be seen and the operator can thus note the time simultaneously with the correct positioning of the bubble and image and with the operation of the finger piece 29. It is thus not necessary for the operator to take his eye from the eye piece and look away at a watch or other time piece. By simultaneously viewing the correctly positioned images and the time piece a much more accurate record can be obtained. As stated, the light is focused on dial 19b and bubble 15 by lens 18. Several observations are usually taken. Afterwards the drum 25 can be turned to register each mark with pencil 27 and the reading made on the scale. An average is then secured. The operation described where the operator looks through the eye piece 10b is called an indirect operation since he does not look directly at the object 32. Such an operation is most commonly used when viewing the sun since the sun is a little too bright to observe directly. The sides of casing 10 at the portion 10h are spaced to form an opening and the operator can place his eye at said portion and directly view the star 32 which will be reflected from the surface of index glass 31 along the line 12. Otherwise the operation is the same as described. It will be understood that an opening is provided at portion 10j of the casing for viewing the desired object.

Figure 4:
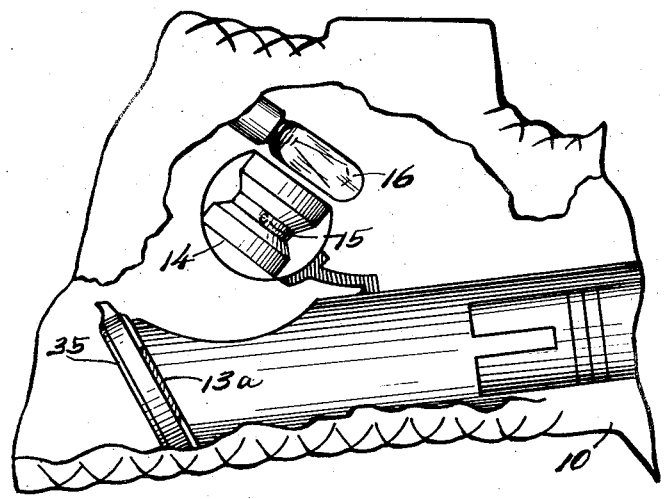
Fig. 4 is a partial view similar to Fig. 1 showing a modified form of the device.
Figure 5:
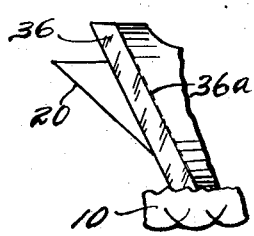
Fig. 5 is a fragmentary view in side elevation showing a modification.

In Fig. 4 a modification is shown in which a time piece such as a watch 35 is placed directly back of the mirror 13a so that the operator can view the outer portion of the dial when looking at mirror 13a. In such case the portion of the dial which is visible will be illuminated by lamp 16 which shines through the bubble mechanism 14. In place of the mirror 13a shown in Figs. 1 and 3, a half-silvered glass plate 36 could be used having a light layer 36a of silver over its entire surface. (See Fig. 5.) Such a mirror reflects the image, yet it is possible to see through it and watch 19 could be seen through the mirror 36. Also the portion of plate 13 about mirror 13a could be omitted so watch 19 would be directly seen.

From the above description it will be seen that we have provided a novel structure of sextant and one which greatly facilitates noting the time of the reading. As above stated, the operator notes the time simultaneously with viewing the properly positioned images and making the record mark on the tape 26. The device is conveniently constructed so that if desired, the operator can place his own wrist watch in the portion 10d of the casing. The watch such as an ordinary wrist watch, can be easily and quickly inserted in the casing or removed therefrom. The device has been amply demonstrated in actual practice and found to be very successful and efficient.

It will of course be understood that various changes may be made in the form, details, arrangement and proportions of the parts, without departing from the scope of applicant's invention, which generally stated, consists in a

What is claimed is:

1. A sextant structure comprising a casing having a sight opening through which a heavenly body may be observed, a bubble mechanism in said casing including a movable bubble, a mirror substantially circular in outline disposed to be seen through said sight opening in which said bubble is reflected, a transparent zone adjacent said mirror, movable means including a collimating lens for causing the image of said heavenly body to appear to coincide with the reflection of said bubble in said mirror, a time-piece disposed beyond said mirror having a dial disposed to be observed through said transparent portion by an observer having his eye at said sight opening and means for illuminating said time-piece whereby when said image and reflection are positioned as desired in said mirror said observer can simultaneously note the time without taking his eye from said sight opening.

2. A sextant structure having in combination, a casing, said casing having a sight opening adjacent one end thereof through which a heavenly body may be observed, a time-piece at the end of said casing opposite said sight opening and having a dial directed toward said sight opening, a removable portion at said last mentioned end of said casing for facilitating positioning of said time-piece, a bubble mechanism in said casing including a movable bubble, a mirror between said sight opening and time-piece disposed in the line of sight, said dial being of larger diameter than said mirror whereby an annular portion of said dial and the cooperating hands of said time-piece may be observed around said mirror and means including a collimating lens for causing the image of said heavenly body to appear to be in said mirror and adjacent the reflection of said bubble in said mirror whereby when said observer has said reflection of said bubble positioned as desired in said mirror and said image of said heavenly body appearing to be in the mirror as desired, he can simultaneously note the time without taking his eye from said eye-piece or otherwise moving said sextant.

3. A sextant structure comprising a casing having a sight opening through which a heavenly body may be observed, a collimating lens in said casing, a bubble mechanism in said casing including a movable bubble, a mirror positioned in the line of sight and viewed through said lens in which said bubble is reflected in the line of sight, a transparent zone about said mirror, means including a collimating lens for causing the image of said heavenly body to appear to be located in said mirror so that it can be brought into position substantially coincident with the reflection of said bubble in said mirror, a time-piece dial disposed beyond said mirror adapted to be observed through said transparent portion by an observer having his eye at said sight opening, said bubble and said dial being at the same distance from said mirror, said distance plus the distance from said mirror to said lens being substantially equal to the principal focal distance of said lens whereby when said image and reflection of said bubble are positioned as desired in said mirror, said observer can simultaneously note the time on the dial of said time-piece through said transparent zone without movement.

4. A sextant structure having in combination, a casing having a sight opening therein, an eye-piece at said opening through which a heavenly body may be observed, a movable sight glass for reflecting an image of said heavenly body so that it appears to be in the line of sight of said eye-piece, a bubble mechanism in said casing comprising a movable bubble, a mirror disposed in the line of sight and positioned so as to reflect an image of said bubble into the line of sight, a lens disposed in the line of sight between said mirror and eye-piece, a time-piece disposed beyond said mirror in the line of sight comprising a dial having numerals at its periphery and hands moving thereover, said bubble and said dial being spaced from said lens by substantially the principal focal distance of said lens and said dial being larger than said mirror so that the numerals on said dial and the outer portions of said hands can be viewed about said mirror whereby when said image and reflection of said bubble appear to be substantially coincident adjacent the center of said mirror the operator can simultaneously note the time indicated on said time-piece without taking his eye from said eye-piece or otherwise moving said sextant.

RUSSELL PARRY FERLEN.

REFERENCES CITED

The following references are of record in the file of this patent:

UNITED STATES PATENTS

| Number | Name | Date |
|---|---|---|
| 994,569 | Calhoun | June 6, 1911 |
| 1,043,562 | Bedell | Nov. 5, 1912 |
| 1,296,641 | Estoppey | Mar. 11, 1919 |
| 1,411,689 | Frederick et al. | Apr. 4, 1922 |
| 1,528,082 | Schlaich | Mar. 3, 1925 |
| 1,703,386 | Boykow | Feb. 26, 1929 |
| 1,703,705 | Beij | Feb. 26, 1929 |
| 1,779,853 | Carbonara | Oct. 29, 1930 |
| 1,966,845 | Paulus et al. | July 17, 1934 |
| 2,193,512 | Hagner | Mar. 12, 1940 |
| 2,266,741 | Crane et al. | Dec. 23, 1941 |
| 2,359,484 | Link et al. | Oct. 3, 1944 |

FOREIGN PATENTS

| Number | Country | Date |
|---|---|---|
| 617,223 | France | Nov. 13, 1926 |